3,326,691
EDIBLE FOAM-PRODUCING COMPOSITION
Earl P. Moore, Green Acres, Wilmington, Del., assignor to E. I. du Pont de Nemours and Company, Wilmington, Del., a corporation of Delaware
No Drawing. Filed Oct. 11, 1965, Ser. No. 494,857
3 Claims. (Cl. 99—1)

This invention relates to foamable compositions and is more particularly directed to aqueous foamable compositions suitable for human consumption, having a pH of 5.5 to 7.5 and comprising from ½ to 10% by weight of fibrous alumina monohydrate based on the weight of the composition, and from ½ to 10% by weight based on the weight of the alumina of a compound which I will refer to as a foam coactant. This invention is further directed to the edible foamed compositions and to their use in preparing foods and food substitutes.

The foamable compositions of this invention are capable of generating foams whose volumes are as great as 30 times that of the original compositions and the foams thus generated can be eaten while moist or can be dried to produce structures comprising fibrous alumina monohydrate and such food ingredients as sugar, flavorants, milk, colorants, non-caloric sweeteners and many other food substances. These compositions exhibit very desirable properties for human consumption such as creaminess, fluffiness, and pleasant taste and the alumina constituent is non-caloric and not subject to bacterial degradation.

Fibrous alumina monohydrate suitable for use in the compositions of this invention can be any of the products described for example in Bugosh U.S. Patent No. 2,915,475 issued Dec. 1, 1959, or such commercially available products as "Baymal"® alumina monohydrate sold by E. I. du Pont de Nemours and Company.

The foam coactants suitable for use in this invention are compounds which when mixed with alumina monohydrate and water in accordance with the proportions of this invention permit the preparation of foamed food compositions.

Foam coactants which have been found to form suitable foams in accordance with this invention include salts of substituted hydrolyzed protein acids such as Maypon UD, sodium undecylenyl polypeptidate and Maypon 4C, potassium cocoyl polypeptidate; straight chain saturated carboxylic acids such as hexanoic, heptanoic, octanoic, nonanoic, decanoic, undecanoic, dodecanoic, tridecanoic, tetradecanoic, pentadecanoic, hexadecanoic, heptadecanoic, octadecanoic, and their mixtures; unsaturated acids such as oleic and 10 undecylenic; branched chain acids such as Neo-pentanoic, Neo-heptanoic, Neo-decanoic, Neo-tridecanoic, acids sold by the Shell Corporation and Versatic 911 acid sold by the Enjay Corporation; salts of the above acids such as the ammonium, sodium, potassium, lithium and organic amine salts; aromatic compounds such as long-chain alkyl benzene sulfonic acids and their salts, e.g., dodecyl benzene sulfonic acid; carboxylic acids and their salts, e.g., p-octyl benzoic acid; salts of esters of long-chain alcohols and sulfuric acid such as "Duponol"® C, sodium lauryl sulfate, "Duponol"® AM ammonium lauryl sulfate, and "Duponol"® EL triethanol amine lauryl sulfate; and other compounds such as cyclohexyl butyric acid; 10-hydroxydecanoic acid; "Maprosyl" 30, sodium lauroyl sarconsinate; 9-ethyl-eicosan-1,20-dioic acid; sodium pentachlorophenate; dioctyl sodium sulfosuccinate; chlorendic acid; and "Zelec" UN, a fatty alcohol phosphate.

Preferred foam coactants for reasons of most desirable foam consistency are hexanoic, octanoic, nonanoic, decanoic, tetradecanoic and oleic acids and the salts of esters of long-chain alcohols and sulfuric acid.

The coaction between the above compounds and the other components of the compositions of this invention is not completely understood; however, some interaction between the components permits for generation of foams which when in admixture with foods or food substitutes are edible compositions possessing exceptional properties as is more fully illustrated hereinafter.

The amount of alumina used in the aqueous compositions of this invention ranges generally from about ½ to about 10 percent by weight of the total composition. Amounts of alumina below ½ percent can be used but tend to cause undesirable reduction in foamability of the aqueous compositions.

Similarly, amounts of alumina in excess of 10 percent can be used but tend to make the aqueous compositions too thick to foam.

Preferred amounts of alumina are from about 1 to about 5% by weight of the total composition. Such alumina concentrations offer the most desirable consistency in the aqueous compositions for ease of admixture and foaming.

The amount of foam coactant used will vary from about ½ to about 10% by weight based on the weight of the alumina. Amounts of foam coactant of less than ½ percent can be used if desired but the quality of the foam will be somewhat reduced. Amounts of foam coactant in excess of 10% can be used without any marked decrease in foaming effectiveness. However, since there is little apparent benefit derived from the use of the larger amounts, such use is considered superfluous.

Suitable food ingredients for use in the compositions of this invention include sugar, flavorants, milk, colorants, non-caloric sweeteners and innumerable other food substances and food substitutes.

The specific food ingredient to be used and the amount of such ingredient used will depend on the ultimate food product which is desired. Generally speaking, however, almost any amount of food ingredient can be used in the compositions of this invention. For example, the amounts of food ingredients used in the examples which follow range from 10% to 5000% by weight based on the weight of alumina used.

The foamable compositions of this invention can be prepared by simply admixing the individual constituents and stirring them until they are uniformly interdispersed in relation to each other.

While the order of admixture is not critical, it is sometimes preferred to start by preparing an alumina sol and thereafter add the other components.

Ordinarily the aqueous compositions will have a pH of about 7 after interdispersion. However, as the ratio of components permit for wide variance in the amounts of each component which can be present, it is possible to obtain an aqueous composition with a higher or lower pH. While such compositions can be used to produce satisfactory foams, it is preferred to adjust the pH to a range of about 5 to 8 prior to foaming, and for best results it is preferred that the pH be in the range of 5.5 to 7.5. If desired, pH adjustment can be made initially on the alumina sol by either bringing it to a neutral pH or to any other pH which is desired for the aqueous composition.

For pH adjustment dilute alkalis such as ammonium hydroxide, sodium bicarbonate, sodium hydroxide, potassium hydroxide, or lithium hydroxide can be used as required, as can organic water-soluble bases such as triethanolamine.

The aqueous foamable compositions can be converted into foams by any of the many suitable means well known to the art. For example, the compositions can be foamed mechanically with vigorous agitation which can be obtained from beater type mixers, blender type mixers, or commercial foam producers. Alternatively, the foamable composition can be packaged such as in an aerosol container to produce a foamed composition when ejected. Means of preparing foams will be more fully exemplified hereinafter.

Representative of the foamed compositions of this invention are meringue-like pie toppings which can be served moist or after caramelization, ice-milk and ice cream types of desserts, cake icings and food toppings, mashed potatoes, peanut butter, salad dressings and mayonnaise. Numerous other food products will be apparent to those skilled in the art from the disclosures of this invention.

While this invention has been drawn in terms of fibrous alumina monohydrate it should be understood that other aluminas can be used in the compositions of this invention without departing from the concept of this invention.

For example, such aluminas as that sold as "Catapal" alumina by the Continental Oil Co., Alon C–49 sold by the Cabot Co., Hydral 705 sold by the Aluminum Company of America, and Lepaudin No. 20 sold by the Degussa Company of Germany can all be used in the compositions of this invention.

Similarly, other aluminum compounds such as "Chlorohydrol," an aluminum chlorohydroxide sold by the Reheis Company, can be used in the compositions of this invention.

In order that this invention can be better understood the following illustrative examples are given wherein parts and percentages are by weight unless otherwise noted.

*Example 1*

This example describes the preparation of a foamed product which closely resembles marshmallow.

A 4% dispersion of "Baymal" ® colloidal alumina is prepared by blending 8 grams of "Baymal" into 192 grams of water with mild agitation by means of a "Waring" blender. The pH of the dispersion is adjusted to 6.5 by dropwise addition of dilute ammonia, and 0.8 gram of tetradecanoic acid dissolved in 8 millimeters of ethyl alcohol is then added to the dispersion. The dispersion is whipped into a foam with air by beating it in an electric mixer of the "eggbeater" type. Finally, 200 grams of sugar is blended into the mixture.

The final product is a white, fine-textured, good-tasting, material similar to whipped marshmallow. It is too stiff to be poured, but is easily spooned or spread.

*Example 2*

This example describes the preparation of a non-caloric cake icing.

A 1% dispersion of "Baymal" ® colloidal alumina is prepared by blending 2 grams of "Baymal" into 198 grams of water with mild agitation by means of a "Waring" blender. The pH of the dispersion is adjusted to 7.5 by dropwise addition of dilute ammonia, and 0.2 gram of "Duponol" C, sodium lauryl sulfate, dissolved in two milliliters of water is added to the dispersion. Two-tenths of a gram of calcium cyclamate contained in 20 milliliters of water is added and the dispersion is whipped into a foam as described in Example 1.

The product is a white, fluffy, good-tasting cake icing which is fluid enough to be poured, but which is stiff enough to stand in swirls and peaks when used to ice a cake. A shiny thin surface crust forms as the icing ages, but the rest of the icing remains moist for two to three days and helps retain the moisture of a cake which it covers.

*Example 3*

This example describes the preparation of a foamed product which resembles a pie meringue prepared from egg whites and sugar.

A 1% dispersion of "Baymal" ® colloidal alumina is prepared by blending 2 grams of "Baymal" into 198 grams of water with mild agitation by means of a "Waring" blender. The pH of the dispersion is adjusted to 7.0 by dropwise addition of dilute ammonia, and 0.02 gram of "Duponol" C, sodium lauryl sulfate, dissolved in 0.20 milliliter of water is added to the dispersion. One hundred grams of sugar is added and the dispersion is whipped into a foam as described in Example 1.

The product is spooned or poured on top of a pie filling, and standing peaks are formed with a spoon or spatula. It can be served directly or it can be "browned" or "caramelized" before serving.

*Example 4*

This example describes the preparation of a foamed ice-milk dessert.

Twenty grams of fibrous alumina monohydrate is blended into 180 grams of milk with mild agitation by means of a "Waring" blender. The pH is adjusted to 5.5 dropwise addition of dilute ammonia, and 0.20 gram of oleic acid dissolved in two milliliters of ethyl alcohol is added to the dispersion. One-fourth teaspoon vanilla flavoring and 50 grams of sugar are added and the dispersion is whipped into a foam as described in Example 1. The product is placed in a closed container and frozen.

The frozen product has a pleasant taste and texture when eaten separately, with a sundae topping, with pie or with cake.

*Example 5*

This example describes the preparation of an aerosol foamed food topping.

A 2% dispersion of colloidal alumina is prepared by blending 4 grams into 196 grams of water with mild agitation by means of a "Waring" blender. The pH of the dispersion is adjusted to 7.0 by dropwise addition of dilute ammonia, and 0.04 gram of myristic acid dissolved in 0.4 milliliter of ethyl alcohol is added to the dispersion. The dispersion is flavored and colored with 5 drops of "McCormick's" green food coloring and 10 drops of "McCormick's" pure mint and peppermint extract.

Finally, a mixture consisting of 3 parts "Freon" C–318 liquid propellant and 97 parts of the above dispersion is charged into an aersol container.

The foamed product when dispensed from the aerosol is a viscous pale green, foamed food topping which has a mint odor and flavor, is a suitable topping for cakes, pies and other desserts.

*Example 6*

This example describes the preparation of an aerosol foamed food topping.

A 2% dispersion of fibrous alumina monohydrate containing 5 drops of green food coloring and 10 drops of mint extract is prepared as described in Example 5.

A mixture of 10 parts "Freon" C–318 liquid propellant and 90 parts of the 2% alumina dispersion is charged into an aerosol container. Another aerosol container is charged with the alumina dispersion at 40° F. to an equilibrium pressure of 60 to 115 pounds gauge pressure with nitrous oxide.

The foamed composition when dispersed is similar to the product of Example 5 but is fluffier and less dense.

*Example 7*

This example describes the preparation of an aerosol foamed food topping.

The 2% colloidal alumina dispersion described in Example 5 is charged into an aerosol container to 90 to 115 pounds gauge pressure with nitrous oxide at 40° F.

This topping when dispensed from the aerosol container is stiffer and not as moist as the toppings described in Examples 5 and 6.

*Example 8*

This example describes the preparation of foamed "mashed" potatoes.

A 2% dispersion of "Baymal" ® colloidal alumina is prepared by blending 4 grams of "Baymal" into 196 grams of water in a "Waring" blender as described in the previous examples. The pH is adjusted to 7.0 by dropwise addition of a 10% solution of sodium bicarbonate, and 0.2 gram of "Duponol" C sodium lauryl sulfate is added to the dispersion. Four cups of peeled and diced potatoes are boiled in water for 30 minutes and are then added to the dispersion and whipped as described in Example 1. Finally a teaspoon of table salt, and two tablespoons of butter are blended into the foamed composition.

The final product is a very tasty whipped potato product, similar to mashed potatoes, and is much less dense and whiter than ordinary whipped potatoes.

The above disclosure and examples should not be taken as a recommendation to use the compositions of this invention in any way without full compliance with U.S. food and drug laws and any other laws or government regulations which are applicable.

I claim:

1. An aqueous composition for producing edible foams having a pH of from about 5.5 to 7.5 and comprising in admixture a component selected from the group consisting of foods and food substitutes, about ½ to 10 weight percent of fibrous alumina monohydrate based on the total weight of the composition, and about ½ to 10 weight percent based on the weight of said alumina of a compound selected from the group consisting of hexanoic acid, octanoic acid, nonanoic acid, decanoic acid, tetradecanoic acid, oleic acid, their mixtures, and sodium lauryl sulfate.

2. An aqueous composition for producing edible foams having a pH of from about 5.5 to 7.5 and comprising from about ½ to about 10 weight percent of fibrous alumina monohydrate, based on the total weight of the composition, from about ½ to about 10 weight percent based on the weight of said alumina, of a compound selected from the group consisting of hexanoic acid, octanoic acid, nonanoic acid, decanoic acid, tetradecanoic acid, oleic acid, their mixtures, and sodium lauryl sulfate, and from about 10% to 5000% by weight based on the weight of alumina of a food ingredient.

3. A method of increasing bulk and decreasing caloric content of food and food substitutes comprising foaming said food or food substitute with an aqueous composition of ½ to 10 percent, based on the weight of the aqueous composition, of fibrous alumina monohydrate and from ½ to 10 percent, based on the weight of said alumina, of a compound selected from the group consisting of hexanoic acid, octanoic acid, nonanoic acid, decanoic acid, tetradecanoic acid, oleic acid, their mixtures and sodium lauryl sulfate.

References Cited

UNITED STATES PATENTS 2,915,475   12/1959   Bugosh _____ 99—136 X

A. LOUIS MONACELL, *Primary Examiner.*

J. M. HUNTER, *Assistant Examiner.*